March 31, 1970 — E. F. BRINKER — 3,504,173
MEASUREMENT OF PHYSICAL PARAMETERS OF FREIGHT CARS IN
CLASSIFICATION YARD OPERATIONS
Filed March 13, 1968

INVENTOR
Emil F. Brinker.
BY
W. L. Stout
HIS ATTORNEY

United States Patent Office 3,504,173
Patented Mar. 31, 1970

3,504,173
MEASUREMENT OF PHYSICAL PARAMETERS OF FREIGHT CARS IN CLASSIFICATION YARD OPERATIONS
Emil F. Brinker, Blackridge, Pa., assignor to Westinghouse Air Brake Company, Swissvale, Pa., a corporation of Pennsylvania
Filed Mar. 13, 1968, Ser. No. 712,738
Int. Cl. B61l 25/02
U.S. Cl. 246—122    13 Claims

ABSTRACT OF THE DISCLOSURE

A photocell detector and a wheel detector are collocated along a stretch of track to detect the passage, respectively, of the leading and trailing couplers and each axle of each car traversing that track, whether in single- or multi-car cuts. Detection of the lead coupler of a cut actuates a digital computer arrangement to count doppler pulses supplied from radar apparatus measuring cut motion. Since each pulse is equivalent to a fixed amount of motion, the total count at any instant is indicative of the length of that part of the cut already passed the detectors. Count samples taken when each axle passes a point are used in computations to determine the number of axles on each car and the length of each single- or multi-car cut.

---

This invention pertains to the measurement of physical parameters of freight cars during classification yard operations. More specifically, my invention relates to apparatus and a method for determining the number of axles and the length of each car moving along a stretch of track or the combined length, total number of axles, and the number of cars coupled into a multi-car cut.

The use of automatic control systems for railroad classification yard operation is well known. Such control systems provide, as a first minimum feature, an automatic switching system to distribute incoming cars to the various storage tracks, selected in accordance with the ultimate destination, local or distant, of each car. A second minimum feature is a speed control system for the cars or cuts as they move from the hump to the selected storage track in order to provide a proper coupling speed with cars already standing in that storage track to prevent damage to the cars or their contents. With the introduction of improved yard control systems using a digital computer for control purposes, it has become possible to provide, as some additional features, an inventory of the cars occupying each storage track and the identity and location of cars which have been inadvertently misrouted during classification.

The operation of even the earlier type yard control systems requires many items of information concerning car characteristics and the condition of the yard. One such item of information is the length of each car or cut for use in the storage track fullness indication necessary for the proper speed control of the cars. It is also necessary, in order that the various controls may be actuated at the proper times, to follow the progress of the cuts of cars as they move through the yard. This requires detection arrangements which will indicate the changing location of the moving cuts. In the early systems, information concerning the length of cuts has been generally restricted to a count of the average number of 4-axle cars in a cut entering a storage track, the length then being estimated from an average length of such freight cars. Cut detection has formerly been accomplished by detector track circuits at switches and retarders which actuate location transfers in the control system storage elements.

With the use of a digital computer in the control system, with a resulting capacity to handle more accurate and a larger quantity of information regarding all aspects of yard operation, it has become practical to obtain more accurate measurements of various car parameters and use this information to provide an improved control system. For example, cut length, measured more accurately than an estimation otained from an average length multiplied by the number of cars in each cut, allows a more accurate track fullness factor and thus better control of cut speed at coupling. With a record available of the number of axles on each car and/or cut of cars, more accurate car following may be accomplished by counting the axles of a cut in to and out of each switch location to assure that the complete cut has passed and to determine if a following cut has caught up and thus will be misrouted. By thus accurately following the progress of the cars as they move through the yard, track inventory and misrouting reports may be provided. It is also possible, if so desired, to utilize this axle count in, count out to determinte switch occupancy conditions and thus eliminate the switch protection track circuit, or at least any supplemental cut presence detectors for extra long cars. Further, with this more accurate length measurement and car following information available, a practical anti-cornering arrangement at switch locations becomes possible. This measured information regarding the physical parameters or characteristics of the cars thus must include at least the number of axles for each car and for the entire cut, the number of cars in the cut, and the length of the car or cut.

Accordingly, it is an object of my invention to provide improved apparatus for determining the physical parameters of railroad cars in a classification yard.

Another object of my invention is an arrangement of apparatus for more accurately determining the length of railroad cars moving along a stretch of track.

Still another object of my invention is an improved method of measuring the length of cuts of cars moving along a stretch of track in a railroad yard.

Another object of my invention is apparatus for measuring the length of cuts or cars moving along a track by counting the number of pulses, each of which indicates a fixed change of distance, which occur while the cut is passing a selected point along that track.

Another object of my invention is apparent for measuring the length of cars moving along a track which includes a means for detecting the passage of various selected parts of that car at a point in the track, means for counting signaling pulses measuring motion of cars, means for recording the count as the passage of each selected part is detected, and means for computing the length of the car from selected counts which are equivalent to the total length of the car.

It is also an object of my invention to provide apparatus for counting pulses of a radar velocity signal from the time the leading element of a cut of cars passes a selected point along a track, for recording and storing the pulse count as the axles of the cars pass that point, for determining the number of axles by comparison of the recorded pulse counts, and for computing the length of a car from counts recorded between the passage of the leading element of the cut and selected axles which are equivalent to the length of the total car.

Still another object of my invention is an improved method for measuring parameters of a freight car moving along a railroad track by counting signaling pulses, having a number proportional to the amount of motion of the car, from the time the leading part of the car passes a selected point along that track, detecting the passage of each axle of that car and recording the existing pulse count at that instant, determining the number of axles in the car by comparing the pulse counts occurring between the passage of adjacent axles, and computing the length of the car from the recorded counts when the leading axle of the second truck of that car is detected in accordance with the number of axles detected on the first truck of the car.

Other objects, features, and advantages of my invention will become apparent from the following specification and the appended claims.

In practicing my invention, I provide a radar unit operating on the doppler principle for measuring the change of distance of cars or cuts of cars moving along a stretch of track in the classification yard. It is to be noted, of course, that the arrangement of my invention is usable other than in a classification yard, but will find its principal use under such circumstances. In order that the maximum use may be made of the information available from the arrangement, it is preferable that the point of measuring the car parameters, and thus the radar apparatus, be located between the crest of the classification yard hump and the first or master retarder. Preferably the radar unit used in my invention is one which has other uses in the yard control system so that no additional apparatus is required. I also provide apparatus for detecting the leading part of the car, that is, the lead coupler, and each axle of the cars. Specifically, a photocell detector is used to detect the passage of the leading coupler and also to detect the rear coupler of each car. A wheel detector is used along one rail to detect the passage of each wheel and thus each axle of the car units, as it is well known that the wheel detector actually marks the passage of the complete set of a pair of wheels and the corresponding axle. These two detectors are collocated along the track stretch in approach to the radar velocity unit being used as part of this system of my invention.

The count of the doppler radar pulses available from the velocity measurement is begun when the photocell detects the passage of the leading coupler of a car or cut of cars. Since the rate of these pulses is proportional to the car velocity, the pulse count at any instant is thus proportional to the length of the car that has passed the point at which the detectors are located. This pulse count is accomplished by central computer apparatus specifically shown as being a digital computer. However, it is to be understood that, in yards where a digital computer is not in service, other techniques may be used to record the pulse count and perform the computations described later to determine car length and the number of axles. The central computer records and stores the existing count as the passage of each axle of the cut of cars is detected. A comparison of the recorded counts determines the space between successive axles of the car and thus the number of axles on each truck of the car, that is, whether the first truck has specifically 2, 3, or 4 axles. When comparison of the recorded counts indicates that the first axle of the second truck of the car has passed the detector location, the total length of that car may be computed by totaling the existing count and that recorded when the final axle of the first truck passed the detectors. This arrangement is possible since all railroad cars are symmetrical end-to-end about the center line. In other words, the same distance exists between the end of the coupler at each end of the car and the most distant axle of the truck at that end. After the length of the car is computed in terms of the pulse count, the photocell detector is again scanned when the computed total length count is reached in order to determine whether an end-of-cut situation exists. If the photocell light beam is not cleared, that is, the photocell is not reactivated, when the rear coupler of the car passes but is rather blocked by the coupler of a following car coupled thereto, the counting cycle is repeated for each car in the coupled cut of cars. The total cut length is then computed and recorded when the passage of the complete cut is finally detected. The total number of axles in the cut is also recorded for purposes of car following throughout the yard and the control of the automatic switching.

I shall now describe in greater detail the apparatus and the operation of the system of my invention taken in connection with the accompanying drawings in which.

Figure 1:
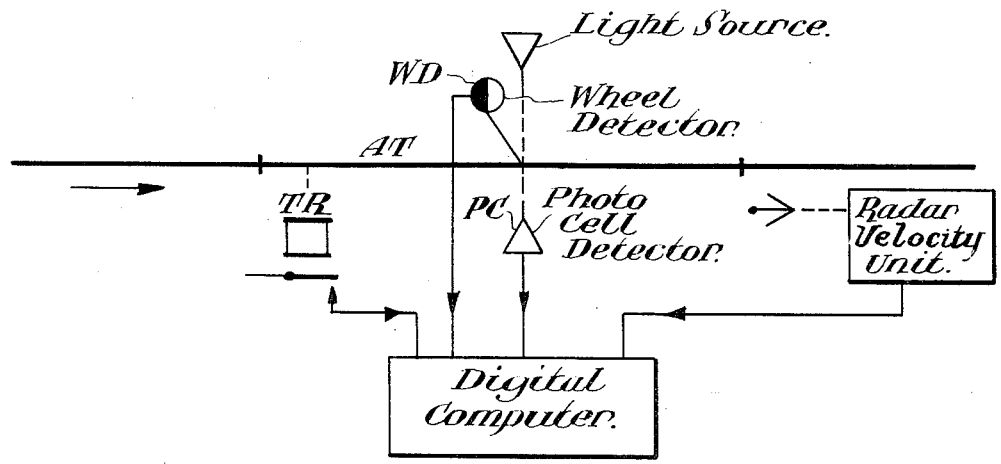
FIG. 1 is a block diagram showing the arrangement of the wayside apparatus along the stretch of track where the measurement of car parameters is to be made.

Referring now to FIG. 1, there is shown in a diagrammatic manner the wayside apparatus and its location along a stretch of track which, for purposes of this description, is assumed to be part of a railroad classification yard. The stretch of track is shown by a conventional single line representation, with a specific section AT set off by insulated joints. The cuts of cars move in a direction indicated by the arrow at the left of the track, that is, from left to right. Preferably this stretch of track is part of the approach to the classification yard after the cars have passed over the hump crest and prior to the time that they reach the master retarder. Under these conditions, this stretch of track may be also that over which measurements of other factors necessary to the control system are taken, for example, the rolling resistance of the cuts of cars.

Shown in block diagram form is a digital computer which is the heart of the assumed yard control system. Obviously, although part of the wayside equipment, the computer is not located adjacent the track but rather in an equipment room for the yard control system where climatic conditions may be maintained at an optimum range. The conventional block designating the digital computer is also intended to include any interface and auxiliary apparatus necessary to receive and coordinate the inputs from the various items of yard and wayside apparatus, including inputs from the items in my system. Since digital computers and such auxiliary associated apparatus are known in the art and various types may be used, the details are not shown but are considered to be sufficiently known and understood for purposes of this description.

The radar velocity unit and associated antenna, represented by conventional symbols, is located to observe cuts of cars moving down the stretch of track, that is, from left to right in the drawing. This radar unit may also be used for speed measurements for other purposes, for example, for the computation of rolling resistance on tangent track and for the approach speed to the master retarder which is assumed to be at the right of the drawing. Thus it is obvious that one advantage of the arrangement of my invention is that apparatus may be used which is already provided by the basic control system by which yard operation is handled. An output from the radar unit consisting of doppler pulses resulting from the reflection of the radar waves from the approaching cars is fed to the digital computer or its auxiliary apparatus for purposes of counting the pulses, as will be explained shortly.

Collocated along this stretch of track in approach to the radar unit are a wheel detector WD and a photocell detector PC and its accompanying light source. Both these detector units are shown by conventional symbols as such apparatus is well known in the railroad signaling art and only a very general description of their operation is needed for an understanding of my invention. Detector WD is positioned beside one rail of the track so that it will be actuated by each passing wheel moving along that particular rail. This wheel detector thus indicates or detects the passing of each axle of the cars traversing the track. The signal output corresponding to each axle is delivered to the computer in any well known manner, primarily depending upon the type of computer apparatus in use. The photocell PC and its accompanying light source are, of course, located on opposite sides of the track so positioned as to detect the passage of cars by the interruption of the light beam. The photocell and its light source may be, but are not necessarily, positioned as illustrated in U.S. Patent 2,089,835, issued to J. W. Logan for Apparatus for Detecting the Passage of Railway Cars. In the arrangement of my invention, detector PC is relied on to detect the passage, or the presence at this point, of the couplers of the passing car, that is, the beginning and end of each car. Output signals indicating the presence of these couplers are supplied to the computer in a manner which will shortly be more fully explained. While the photocell detector may also be actuated by the remaining portions of passing cars, this is not critical in the arrangement of my invention. Although the two detector units are collocated at a selected point, the light beam for photocell is not blocked by the wheel detector which is, of course, located at the rail level.

Also used for the detection of cars moving along the track is the insulated track section AT and its accompanying track circuit which is only very conventionally shown. Section AT includes the selected point at which the wheel detector and photocell detector are located and is in approach to the radar unit. The track circuit is indicated only by the track relay TR designated by conventional symbol at the entrance end of the track section. The operation is such that track relay TR is deenergized and in its released position when any part of track section AT is occupied by any wheel-axle unit of any of the cars. An indication to the computer of the occupancy of track section AT is shown as being supplied over a back contact of relay TR, that is, a released position contact. This indication is used to reset the counting apparatus and other recording and storage part of the computer upon the approach of another cut of cars. However, it is to be understood that, in accordance with the actual apparatus in use, a front contact of relay TR may also be used or may be used in lieu of the illustrated back contact. The signal supplied to the computer is merely that a cut of cars has occupied track section AT.

Figure 2:
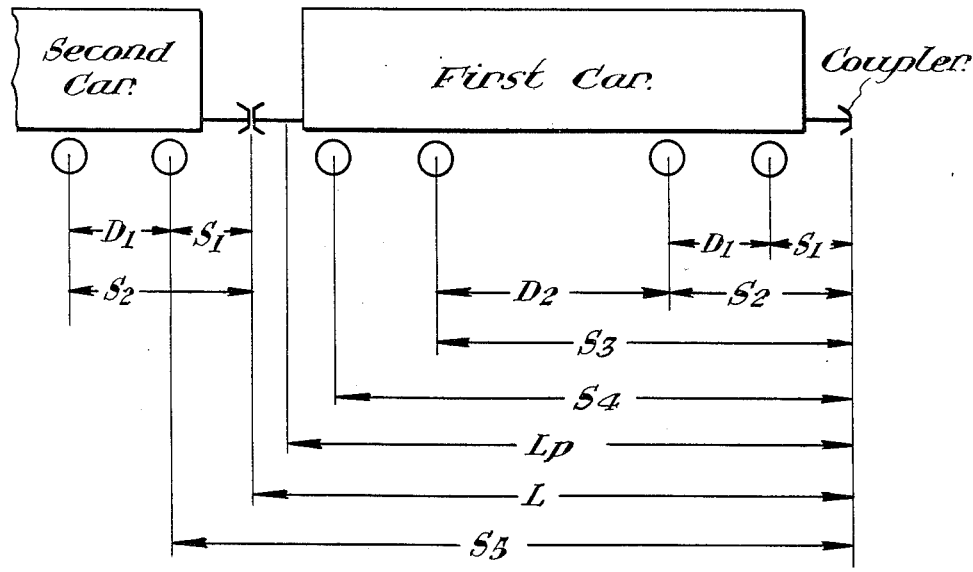
FIG. 2 is a schematic chart illustrating the pulse counts which are recorded and the comparisons which are made during the measurement operation and the corresponding parts of the passing cars which actuate the recording of these intermediate counts.

Referring also now to FIG. 2, I shall describe the operation of the system of my invention. At the top of FIG. 2 is a schematic representation of two cars coupled together which are assumed to be moving along the stretch of track shown in FIG. 1. Illustrated as extending in front of the main body of the first car is the usual coupler. In order that the most accurate car length possible for track fullness information may be provided for the speed control system utilized in the assumed classification yard, the length of this coupler extending in front of the car must be included in the overall length measurement. By including this, of course, the length or space occupied by the couplers between cars of a cut will also be included in the measured length. Below the schematic representation of the two cars is a chart illustrating the various pulse count samples ($S_n$) that are taken during the passage of these cars by the selected point at which the detector apparatus is located. Also shown are the pulse count distances (D and L) which are computed during passage of cars in order to determine the number of axles on each car and the length of not only each car but the entire cut of cars.

As the cars shown in FIG. 2 descend from the hump in FIG. 1 and approach the main part of the yard, the first axle of the first car enters track section AT and shunts the track circuit. The resulting release of relay TR to close its back contact actuates the reset of the pulse counters and initial count storages within the computer arrangement. It is to be understood that, prior to this instant, measurements and other data for the preceding cut have been entered into the memory banks of the computer. Although the radar unit is already active in measuring the speed of this car for the purpose of obtaining other types of information necessary for its control, the output pulses provided to the computer arrangement are not immediately counted after the reset action. However, when photocell PC detects the passage of the lead coupler, the corresponding output signal to the computer arrangement actuates the counting process. This point in the cycle of operation is designated by the vertical marker line at the right of the chart of FIG. 2.

The pulse count continues as the cars move forward past the location of the detectors. When unit WD detects the first axle of the leading car, a sample $S_1$ of the existing count is taken and recorded. This count is, of course, representative of the distance from the leading edge of the coupler to the first axle of this car. A second sample count $S_2$ is taken and recorded when the second axle of the car is detected by unit WD. Immediately a computation is made using the formula:

$$S_2 - S_1 = D_1$$

This distance $D_1$, recorded in the form of a pulse count, is representative of the spacing or the distance between the first and second axles of this leading car. It is to be noted that the same spacing will occur between all axles on any one truck of this particular car whether it be a 2, 3, or 4-axle truck.

In a similar fashion, a third sample count $S_3$ is taken and recorded when the third axle of this leading car is detected by unit WD. Again, a computation is made in accordance with the formula:

$$S_3 - S_2 = D_2$$

Immediately following this computation, a test is made to determine whether the quantity $D_2$ is equal to or is greater than the quantity $D_1$. If distance $D_2$ is equal to distance $D_1$, it is an indication that there are at least 3 axles on the leading truck of this first car. Following a sample count $S_4$, taken when the fourth axle is detected, a similar subtraction provides a distance $D_4$ between the third and fourth axles. It can then be determined whether this leading truck has a fourth axle, which will be the case if distance $D_4$ is equal to distance $D_3$. In this manner, the arrangement of my invention can determine when a passing railroad car has more than the usual 4 axles with which the majority of railroad cars are equipped. When the number of axles on this car has been finaly determined, the information is recorded.

It is assumed here that, as shown schematically at the top of FIG. 2, the leading car has only 4 axles, that is, 2 axles per each truck. In this situation, the quantity $D_2$ is not equal to, but is greater than the quantity $D_1$ and, from this information, a record is made that the leading car of the cut has 4 axles. Also under this situation, when sample count $S_3$ is recorded and the computations indicate a 4-axle car, the program actuates a further computation in accordance with the formula:

$$S_3 + S_2 = L, \text{ the length of the car}$$

This computation is possible at this time since, as previously mentioned, each railroad car is symmetrical about a center line between its two ends. Therefore the distance from the third axle, that is, the leading axle of the second truck, to the end of the trailing coupler is equal to the distance $S_2$ from the leading edge of the first coupler to the final axle of the leading truck. This total distance or length L is also in terms of a pulse count. It may also be noted that, if a 6-axle car has been indicated by distance $D_2$, then sample count $S_4$, when recorded, will indicate the beginning of the second truck since the quantity $D_3$ will be greater than the quantity $D_2$. Under this situation, the computation for the length of the car involves the addition of sample counts $S_4$ and $S_3$. It is obvious that corresponding computations involving additional samples will be made if an 8-axle car is involved After the length L of the leading car is determined, a pulse count LP is established in accordance with the formula:

$$LP = L - \Delta L$$

where ΔL is a count equivalent to a distance on the order of 3 feet. When the running radar pulse counts S is equal to this computed count LP, the photocell detector is again continuously observed by the computer arrangement for an end-of-car or end-of-cut signal. If, at a count S equal to length L, the photocell is activated, a single car cut is determined and the fact recorded. However, if photocell PC is not activated, after S equals L plus an additional small count on the order of ΔL, it is determined that at least 2 cars are in this particular cut and that the parameters for the second car must be measured. It is to be noted that the reason for not continuously observing the photocell detector, other than for the leading coupler of the cut and the last approximately 3 feet of each car, is that there are so many different configurations of modern freight cars that it can not be insured that the photocell light beam will be continuously interrupted for the overall length of any one particular car. Therefore, the one geometrically constant element which also has a constant relationship to the wayside, that is, the coupler and draw bar at each end of each car, has been chosen to operate the photocell. In other words, the photocell is used only to detect the presence of the leading coupler of the car and the final coupler of that car or the connected couplers of two cars of the same cut. It is for this reason that the track circuit for section AT is also used to insure that a cut of cars approaching the radar will be continuously detected during its movement so that the counting action will continue.

Assuming that the presence of a second car in the cut has been determined due to the lack of activation of photocell PC by the light beam when the length of the first car has passed, a sample count $S_5$ is taken and recorded when the next axle of a car is detected. In other words, a sample count $S_5$ is taken when the first axle of this second car is detected. A computation is then made according to the formula:

$$S_5 - L = S_1 \quad (2)$$

which becomes the distance from the leading edge of the lead coupler of the second car to the first axle of that car, that is, the distance $S_1$ for the second car. The manner in which the length L for the second car is determined is equivalent to the operation described for the leading car of this cut. The number of axles is also determined since it is not fixed that all cars of the cut will have the same number of axles. A similar cycle of operation occurs for each other car coupled in this particular cut. In addition to the length of each car and finally the total length of the entire cut, the number of cars and the number of axles for each car is also recorded in order that the car following operation as this cut moves through the yard may be properly accomplished As indicated, the apparatus will handle a combination of 4, 6, and 8 axle cars in the same cut, if necessary.

As the length determination for each cut is completed, information is stored in the storage banks of the computer apparatus. From here it is extracted and applied at the proper times, as the car cut moves throughout the yard, to modify the track fullness information for the assigned storage track and to control the operation of the switching systems to include any anti-cornering arrangement which may be in use in the particular yard.

The system of my invention thus provides an accurate measurement of the length of a single car or of a cut of cars moving through the classification yard and records the number of cars in the cut. It also records the exact number of axles on each car in the cut and for the entire cut. The accurate length information enables a more accurate determination of the track fullness factor which is used in the speed control system. Thus, proper coupling in the storage tracks may be more closely obtained. The arrangement also improves the automatic switching and auxiliary controls such as anti-cornering by providing an accurate determination of cut length and the number of axles, this latter factor being used in the following of the cut throughout its movement to its selected storage track. The count in-count out of the recorded axles of a cut at each switch location assures that the complete cut has moved over the switch and is an indication of its progress to the selected storage track. This axle count detects any catch up of a following cut and the resulting misrouting may be reported. The count may also be used as an effective switch point protection for all cars or as a supplement for long cars. The accurate following of all cars as they move to storage tracks makes possible the furnishing of a track inventory records. This improved operation is obtained with a minimum of equipment. In fact, as pointed out, much of the apparatus used by the arrangement of my invention is already provided to obtain other measurements used elsewhere in the overall yard control system. This joint use of apparatus and the fuller application of its capacity thus effects an economy in the operation of the yard control system while at the same time providing a more accurate and improved operation of the yard.

Having thus described my invention, what I claim is:

1. Apparatus for measuring selected parameters of railroad cars traversing a stretch of track, comprising,
   (a) transducer responsive to the motion of a car on said track for providing a series of pulses, each of which represents a fixed amount of change of distance,
   (b) a memory storage device with connections to said transducer for at times counting said pulses,
      (1) said storage device being controlled by the approach of a car along said track for resetting to a starting condition prior to counting pulses for that car,
   (c) a first detector means located along said track and responsive at least to the passage of the leading and trailing portion of a car for actuating said storage device to count the pulses generated subsequent to the detection of said leading portion of a car,
   (d) a second detector means collocated with said first detector means and responsive to the passage of each axle of a car for actuating said storage device to record the exising pulse count at the time of passage of each axle, and
   (e) said storage device responding to the actuating signals from said first and second detector means for determining at least a length measurement for each car in accordance with the recorded pulse counts.

2. Measuring apparatus as defined in claim 1 in which said transducer includes a doppler radar measuring means providing output pulses in accordance with the velocity of each car.

3. Measuring apparatus as defined in claim 2 in which said storage device is a digital computer programmed for recording the existing pulse count when each axle is detected, for comparing successively recorded counts to determine the number of axles on that car, and for computing the length of that car from two of said recorded counts selected in accordance with the determined number of axles.

4. Measuring apparatus as defined in claim 3 in which said computer is further programmed for observing said first detector means during a period subsequent to the detection of said leading portion of a car and selected to include the pulse count equivalent to the computed length of that car to determine if a following car is coupled thereto in cut formation.

5. Measuring apparatus as defined in claim 4 in which:
   (a) said first detector means is a photocell and an associated light source positioned on opposite sides of said track for detecting the passage of both couplers on each car, (b) said second detector means is a wheel detector positioned along one rail of said track, (c) said stretch of track includes an insulated track section extending in both directions from said collocated detectors and provided with a track circuit responsive to occupancy by each cut of cars for controlling the reset of said storage device upon approach of a cut and for maintaining said device in counting condition during the passage of said cut, and (d) said storage device retains in storage for each cut of cars the length measurement, the axle count of each car, and the number of cars in each cut.

6. Measuring apparatus as defined in claim 1 in which said storage device is responsive to the actuating signals from said first and second detector means and to the existing pulse count for recording at least the number of axles for each car for identifying that car when traversing another location on said stretch separated from the location of said detector means.

7. Measuring apparatus as defined in claim 1 in which said storage device is responsive to actuating signals from said first and second detector means and to the existing pulse count for determining at least the number of cars in a coupled cut of cars traversing said stretch and the number of axles on each car in said cut and for recording such determined parameters to identify that cut when it reaches another location along said stretch separated from the location of said detector means.

8. Measuring apparatus as defined in claim 1 in which said storage device is further responsive to the actuating signals from said first and second detector means and to the existing pulse counts for recording the number of cars in a coupled cut of cars passing said detector means, the number of axles on each car of said cut, and the total length of said cut.

9. A method for measuring selected parameters of each car of a cut of railroad cars traversing a stretch of track, comprising in combination the steps of, (a) detecting the passage of the lead coupler of each car at a preselected point along said track.

(b) counting pulses received from a transducer from the time said lead coupler is detected, the number of said pulses being equivalent to the amount of motion of said car, (c) detecting the passage of each axle of a car at said preselected point, (d) recording the existing pulse count as each axle is detected, (e) comparing the elapsed pulse counts between the passage of successive axles to determine the number of axles on a car, and (f) computing the length of each car by adding selected ones of said recorded pulse counts in accordance with the number of axles determined for that car.

10. The method of measuring railroad car parameters as defined in claim 9, in which the pulse counts selected for computing the length of a car are those two counts recorded at first, the passage of the final axle of the first truck of the car and second, the passage of the first axle of the second truck.

11. The method of measuring railroad car parameters as defined in claim 9 in which the pulse counts selected for computing the length of a car are those two counts recorded at the passage of the second and third axles, when it is determined that the car has only four axles.

12. The method of measuring railroad car parameters as defined in claim 9 further including the additional steps of, (a) observing the passage of each car during the period including the pulse count computed to be equivalent to the length of that car for detecting the passage of the rear coupler to determine if a following car is coupled thereto, (b) repeating the preceding steps for each car coupled in a multi-car cut, (c) recording the number of cars coupled together in said cut, and (d) summing each car length to give the total length of said cut.

13. A method for measuring selected parameters of cuts of cars moving along a stretch of track into a railroad classification yard for following the progress of each cut through said yard to its final destination, comprising in combination the steps of, (a) detecting the passage of the lead coupler of said cut at a preselected point along said stretch of track, (b) detecting the passage of each axle of each car of said cut at said preselected point, (c) counting the signal pulse output of a transducer from the time said lead coupler is detected, the number of pulses being equivalent to the amount of motion of said cut, (d) recording the pulse count from said transducer as each axle is detected, (e) computing the number of axles on each car in accordance with the signal pulse count recorded between the passage of successive axles, (f) computing the length of each car is accordance with the number of axles and the recorded pulse count from the detection of the lead coupler, (g) surveying the cut during the computed time of passage of the rear coupler of each car to detect the presence of a following coupled car, (h) recording the number of axles and the total number of cars in the cut for use in identifying that cut as it later traverses selected locations in the yard.

References Cited

UNITED STATES PATENTS

| | | | |
|---|---|---|---|
| 2,954,462 | 9/1960 | Utt et al. | 246—122 X |
| 3,316,400 | 4/1967 | Dosch et al. | 246—247 X |
| 3,342,989 | 9/1967 | Dwyer et al. | 246—182 X |

RICHARD A. FARLEY, Primary Examiner

T. H. TUBBESING, Assistant Examiner

U.S. Cl. X.R.

246—29, 182, 247; 343—6, 8